United States Patent [19]
Magill

[11] Patent Number: 5,729,570
[45] Date of Patent: Mar. 17, 1998

[54] ORTHOGONAL CODE DIVISION MULTIPLE ACCESS COMMUNICATION SYSTEM HAVING MULTICARRIER MODULATION

[75] Inventor: David T. Magill, Palo Alto, Calif.

[73] Assignee: Stanford Telecommunications, Inc., Sunnyvale, Calif.

[21] Appl. No.: 352,313

[22] Filed: Dec. 8, 1994

[51] Int. Cl.$^6$ .................. H04B 1/707; H04B 1/713; H04L 27/32

[52] U.S. Cl. .................. 375/206; 375/202; 375/260; 375/308; 375/344; 370/204; 370/206; 370/209; 370/210; 370/342

[58] Field of Search .................. 375/200, 202, 375/206, 208, 210, 259–260, 281, 283, 308, 329, 331, 332, 344, 367; 364/721, 725–727; 370/204, 206, 208–210, 320, 335, 342, 441

[56] References Cited

U.S. PATENT DOCUMENTS

| | | |
|---|---|---|
| 4,041,391 | 8/1977 | Deerkoski .................. 375/367 X |
| 4,890,283 | 12/1989 | Tsinberg et al. .................. 375/206 X |
| 5,029,147 | 7/1991 | Andrews et al. .................. 367/134 |
| 5,278,826 | 1/1994 | Murphy et al. .................. 375/200 X |
| 5,278,844 | 1/1994 | Murphy et al. .................. 375/280 X |
| 5,309,474 | 5/1994 | Gilhousen et al. .................. 375/206 X |
| 5,467,367 | 11/1995 | Izumi et al. .................. 375/206 |
| 5,477,195 | 12/1995 | Spilker .................. 375/208 X |
| 5,574,721 | 11/1996 | Magill .................. 375/206 X |

*Primary Examiner*—Young T. Tse
*Attorney, Agent, or Firm*—Jim Zegeer, Esq.

[57] ABSTRACT

An orthogonal code division multiple access (OCDMA) communication system having multicarrier modulation. The incoming input data stream is broken into multiple parallel streams, each of which modulates its own frequency-division multiplexed carrier. This reduces the chipping rate such that the delay spread does not cause excessive access noise. Particularly robust delay lock loop (DLL) code tracking and particularly robust automatic frequency control (AFC) are provided in the presence of frequency-selective fading.

7 Claims, 7 Drawing Sheets

ORTHOGONAL CODE DIVISION MULTIPLE ACCESS COMMUNICATION SYSTEM HAVING MULTICARRIER MODULATION

BACKGROUND OF THE INVENTION

Orthogonal code-division multiple access (OCDMA) has been proposed (see U.S. patent application Ser. No. 980,957 (now U.S. Pat No. 5,375,140), incorporated herein by reference) as an effective technique for improving the capacity, i.e., bandwidth efficiency, of the more conventional quasi-orthogonal CDMA (QOCDMA). QOCDMA is frequently referred to as asynchronous CDMA since the chips (for direct sequence PN) or the hops(for pseudo-random frequency hopping) are not aligned in time. As a consequence of the nonalignment, or asynchronicity, it is not possible to achieve true orthogonality and QOCDMA systems suffer from interference from other system users or what is commonly known as access noise. As a result of this access noise OCDMA systems cannot achieve as high a capacity, i.e., number of channels, in a given amount of bandwidth as can an orthogonal system such as OCDMA.

As noted above OCDMA requires time base alignment of all accesses and this can be done readily in star networks provided that the subscriber terminals, i.e., remote units, are not moving too quickly nor are too far removed from the base station, i.e., hub of the star network. In addition, there is another propagation condition that must be met that is of particular concern when the subscriber terminals employ antennas that do not have a great deal of directivity. In such situations there may be considerable multipath and the delayed path signals will contribute access noise since these signals being non-aligned In time will be nonorthogonal. However, if the multipath delay spread is small in comparison to the chip duration of the orthogonal codes, the impact of the multipath signals is negligible. By choosing a suitably low chipping rate and restricting operation to indoor environments, where the delay spread is quite small, this condition may be assured. Thus, the first application of OCDMA has been to a wireless PBX where these conditions can be met.

The present invention is directed to efficient use of OCDMA in those environments, such as outdoors, where there is a large delay spread. As user data rate requirements increase one expects the chipping rate to increase making the delay spread problem much more serious. The object of the invention is to provide a very effective system for dealing with these situations.

There are really two problems. One problem occurs at the subscriber terminal and the other at the base station. At the subscriber terminal the problem could be solved through the use of an equalizer which would remove or alleviate the effect of the multipath and restore orthogonality. However, at the base station this approach is not feasible since each signal traverses a different path to the base station and, consequently, has a different multipath profile. Thus, an equalizer operating on the composite signal is presented with an impossible task of simultaneously equalizing multiple paths. Thus, it is desirable to find a solution which may be applied to both inbound and outbound links. This invention presents such a solution. The same solution is symmetrically applied to both outbound and inbound links and no equalization is required on either link.

THE PRESENT INVENTION

The impact of time base error or delay spread on access noise or cross-talk between orthogonal channels can be minimized by making the pseudonoise/Radamacher Walsh (PN/RW) chipping rate suitably low. For example, if the delay spread is less than 10% of a PN/RW chip duration the access noise is essentially negligible. The chipping rate is determined by the product of the data symbol rate and the order of the RW signal set. Typical values for the RW set size are 16, 32, or 64. Thus, the chipping rate is typically in the range of 16 to 64 times the data baud rate. The present invention minimizes the chipping rate by using a modulation format with a low baud rate.

The OCDMA system disclosed in the above-referenced patent application employed QPSK data modulation in order to exploit its bandwidth efficiency. The present invention lowers the baud rate by use of multiple parallel QPSK channels. (QPSK data modulation was selected as an example owing to its simplicity of implementation, high bandwidth efficiency, and good power efficiency, i.e., low Eb/No requirement for a given BER. The invention disclosed herein can work with a large variety of data modulation formats. The novel features is the use of multiple (modulation) carriers with OCDMA.) That is, the input data stream is broken into multiple parallel streams each of which modulates its own frequency division multiplexed carrier. As a result the baud rate is reduced by a factor equal to the number of parallel carriers. Typical numbers are 8, 16, or 32 but larger numbers may be advantageous. This approach is known as multicarrier modulation (MCM) and was first used (shortly after World War II) to combat delay spread in HF radio digital communication. Use of longer symbols means that the intersymbol interference (ISI) caused by multipath causes less degradation in the bit error rate (BER) versus SNR (or Eb/No) performance.

The present application of MCM modulation to OCDMA is not intended to reduce the effect of ISI. Rather it is intended to reduce the chipping rate such that delay spread does not cause excessive access noise.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
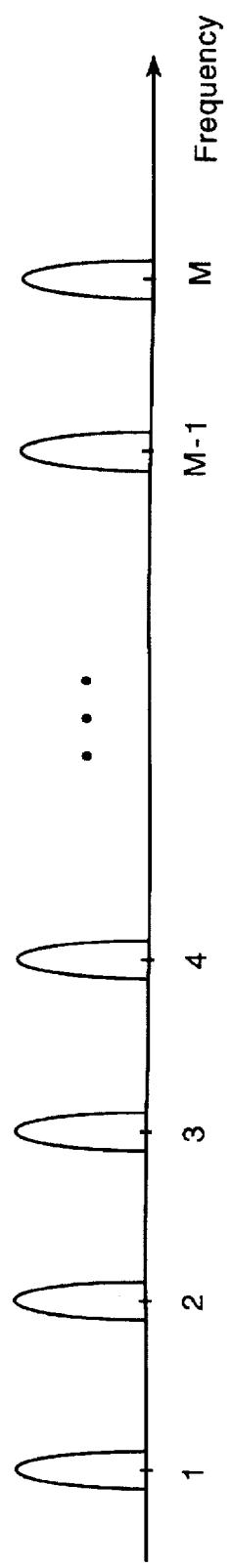
FIG. 1a is the power spectrum of data modulated MCM signal prior to PN/RW chip modulation.
Figure 1B:
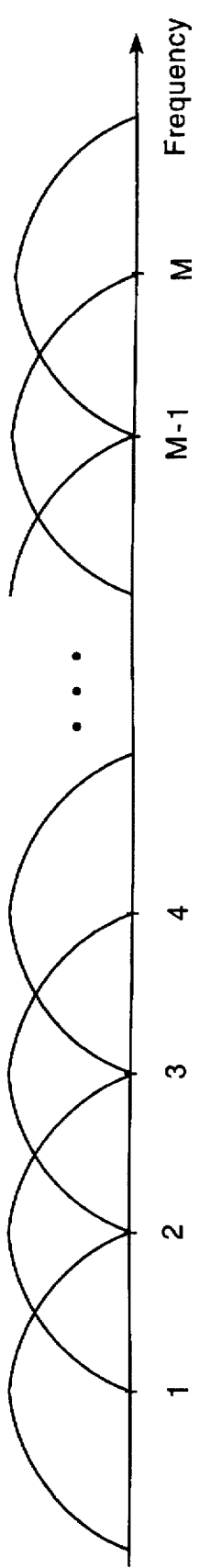
FIG. 1b is the power spectrum of MCM signal after PN/RW chip modulation.

For reasons of bandwidth efficiency the modulation carriers are spaced with the minimum orthogonal spacing. Each carrier is modulated by the same PN/RW function. However, in a given frequency channel there are multiple PN/RW codes, e.g., 32. Thus, to maintain orthogonality it is necessary to space the carriers by the chipping rate. FIGS. 1a and b illustrate the transmitted spectrum assuming the use of rectangular pulse chips and data symbols. FIG. 1b illustrate the transmitted spectrum, while FIG. 1a illustrates the spectrum that would exist if the PN/RW chip modulation were removed. The invention can be extended in an obvious manner to the use of non-rectangular pulses for those situations in which that is desirable.

REPRESENTATIVE TRANSMITTER

Figure 2:
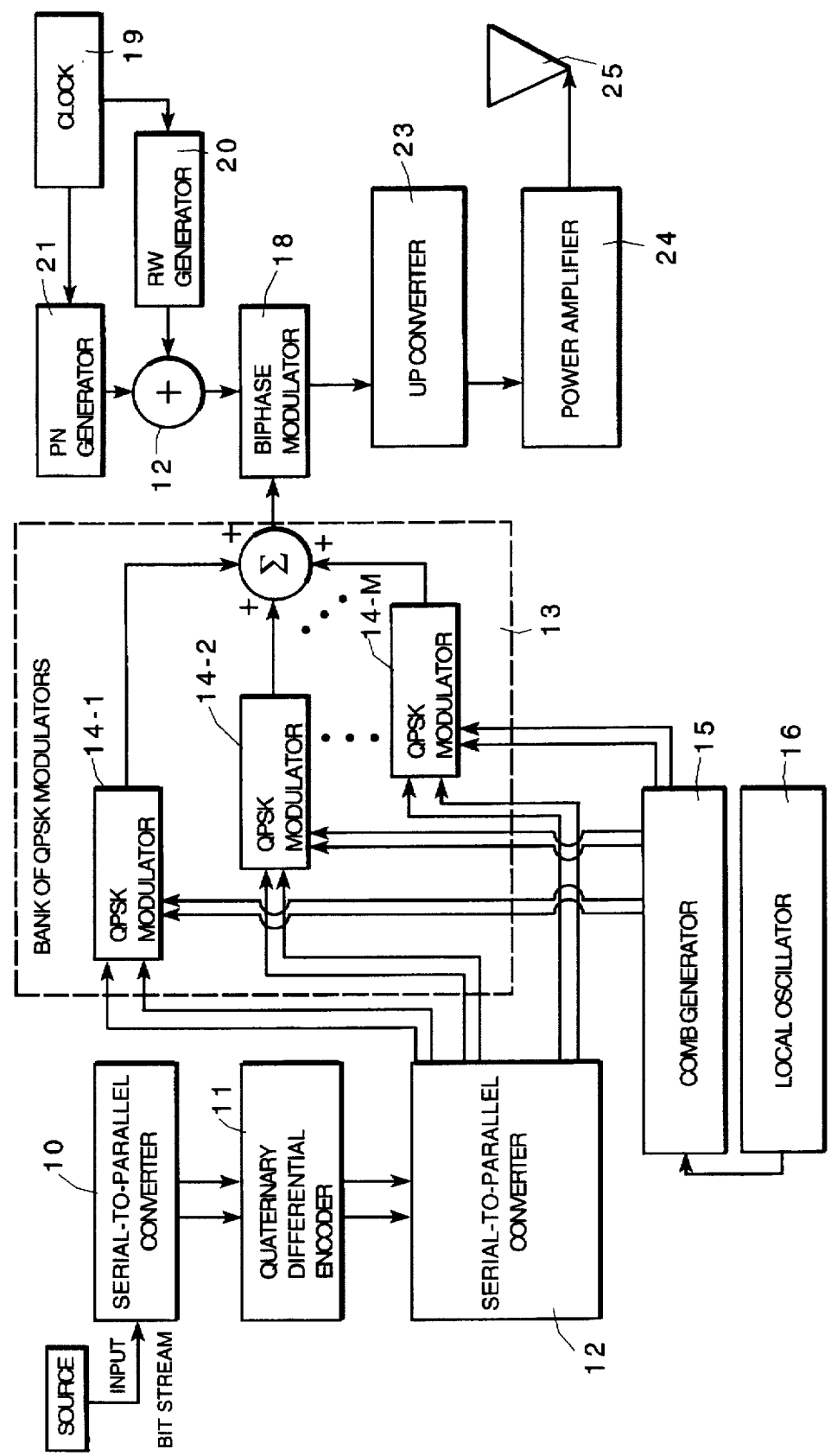
FIG. 2 is a block diagram of representative MCM OCDMA transmitter.

FIG. 2 is a block diagram of a representative transmitter. Note that in the illustrated system no forward error correction (FEC) coding is shown. However, FEC could be incorporated in the present invention in a straightforward manner. The input bit stream is first applied to a serial-to-parallel converter 10 which provides two binary outputs at half the rate of the input stream. Together the two bits represent a quaternary signal. The quaternary stream is differentially encoded 11 using a Gray code representation. The output of the quaternary differential encoder 11 is then processed by a subsequent serial-to-parallel converter 12 to produce multiple (M) parallel streams of quaternary data(each a pair of binary streams). Typically there may be 16 or 32 such parallel streams but depending on the application a large variation in the number of carriers exists. The outputs of the parallel-to-serial converter 12 are applied to a bank 13 of M QPSK modulators 14-1, 14-2. . .14-M. The other inputs to this modulator bank 14 comes from a comb generator 15. The comb generator 15 produces a set of M equal amplitude and equally-spaced (by the chipping rate) sinusoids and matching cosinusoids. The outputs of each QPSK modulator 14-1, 14-2. . . 14-M are summed 17 to produce the composite MCM waveform. This waveform, which includes only data modulation, is then applied to a bi-phase shift keying modulator 18 whose other input (a binary one) is the selected PN/RW code used to spread the data modulated signal. In this embodiment, clock 19 commonly supplies Radamacher Walsh (RW) generator 20 and pseudonoise (PN) generator 21 whose outputs are summed at 22 to constitute the selected PN/RW spreading code inputted to biphase modulator 18. The resulting MCM OCDMA signal is then upconverted 23 to the desired frequency, amplified in a power amplifier 24, and transmitted through an appropriate antenna 25.

The transmitter embodiment shown in FIG. 2 was Selected for explanatory purposes. In most practical implementations use of a bank of modulators and a comb generator may prove too costly. These functions would be implemented in a digital signal processor using the inverse fast Fourier transform (IFFT).

Incorporation of the IFFT in the present invention is accomplished in a manner obvious to those skilled in the art.

REPRESENTATIVE RECEIVER

Figure 3:
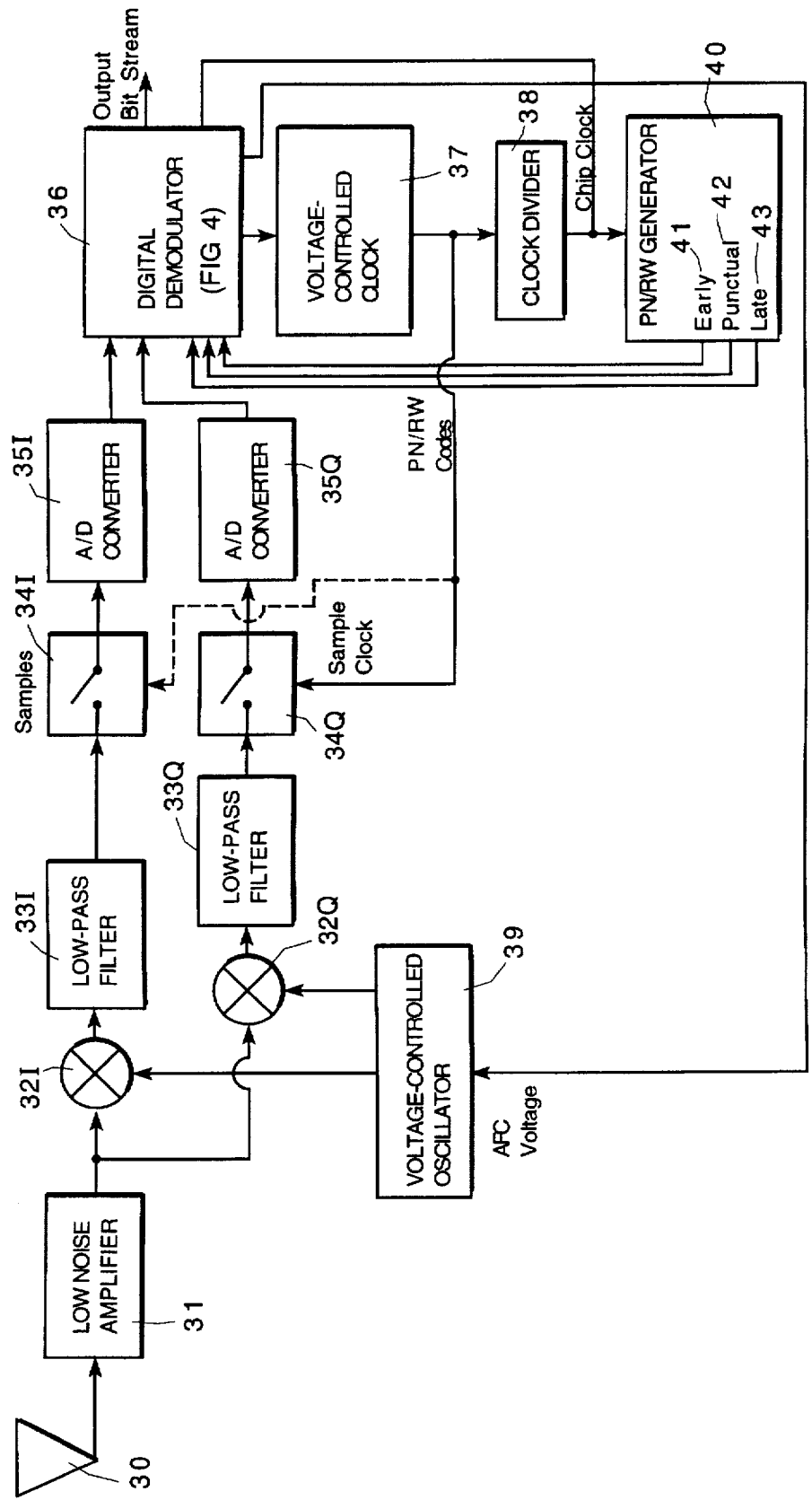
FIG. 3 is an overall block diagram of a representative MCM OCDMA receiver.
Figure 4:
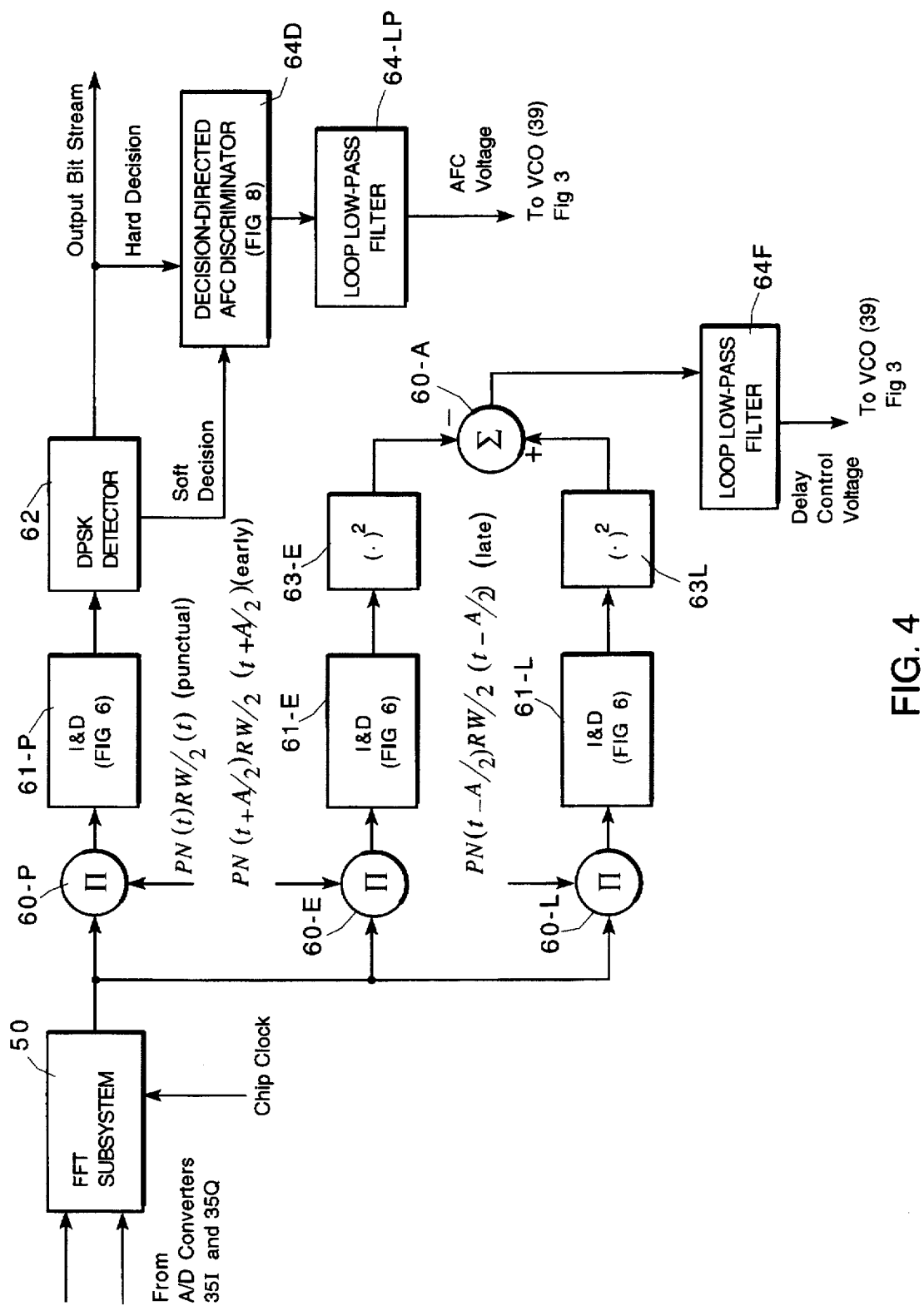
FIG. 4 is a block diagram of a representative digital demodulator.

FIG. 3 is an Overall block diagram of a representative receiver for the MCM OCDMA signal. As shown in FIG. 3, the received -signal is amplified in a low-noise amplifier (LNA) 31 and down converted to baseband with a quadrature downconverter 32I, 32Q yielding both in-phase (I) and quadrature (Q) baseband outputs. After the low-pass filters 33I, 33Q (used to avoid aliasing) these signals are sampled 34I, 34Q, and analog-to-digital converted 35I, 35Q. These samples are then sent to the digital demodulator 36 whose block diagram is shown in FIG. 4. Outputs of the digital demodulator 36 subsystem are the AFC control voltage which is sent to the voltage-controlled oscillator (VCO) 39 in FIG. 3, the delay control voltage which is sent to the voltage-controlled clock (VCC) 37 in FIG. 3, and the output bit stream. The VCC output is the sample clock. The VCC drives a digital divider 38 that produces the chip clock which is integrally related to the sample clock. Typically, there might be 32 or 64 samples taken each chip. The chip clock drives the PN and RW generators which provide early 41, punctual 42, and late 43 outputs that are used by the digital demodulator 36 to generate the delay error discriminator function for the delay-lock loop tracking and to strip off the PN/RW chip modulation in the de-spreading cross-correlator.

As shown in FIG. 3 the VCO 39 has its frequency controlled by an automatic frequency control (AFC) voltage that is developed in the digital demodulator 36. Use of AFC keeps the received MCM carrier frequencies accurately aligned with the FFT frequency bins. While automatic phase control (APC) is possible and consistent with this invention, the performance of APC in a fading multipath environment is poor due to the much greater loss-of-lock probability. Thus, for the example system AFC is the preferred embodiment. The output bit stream of the digital demodulator 36 is the desired received bit stream.

For explanatory purpose the block diagram in FIG. 3 shows a quadrature downconverter generating the I and Q samples. In practice, it is simpler to use bandpass or IF sampling since this requires fewer low-pass filters, mixers, and A/D converters. I and Q sample streams are obtained simply by down sampling by a factor of two and complementing alternate samples. Use of IF sampling with the invention disclosed herein is accomplished in a manner obvious to those skilled in the art.

REPRESENTATIVE DIGITAL DEMODULATOR

Figure 5:
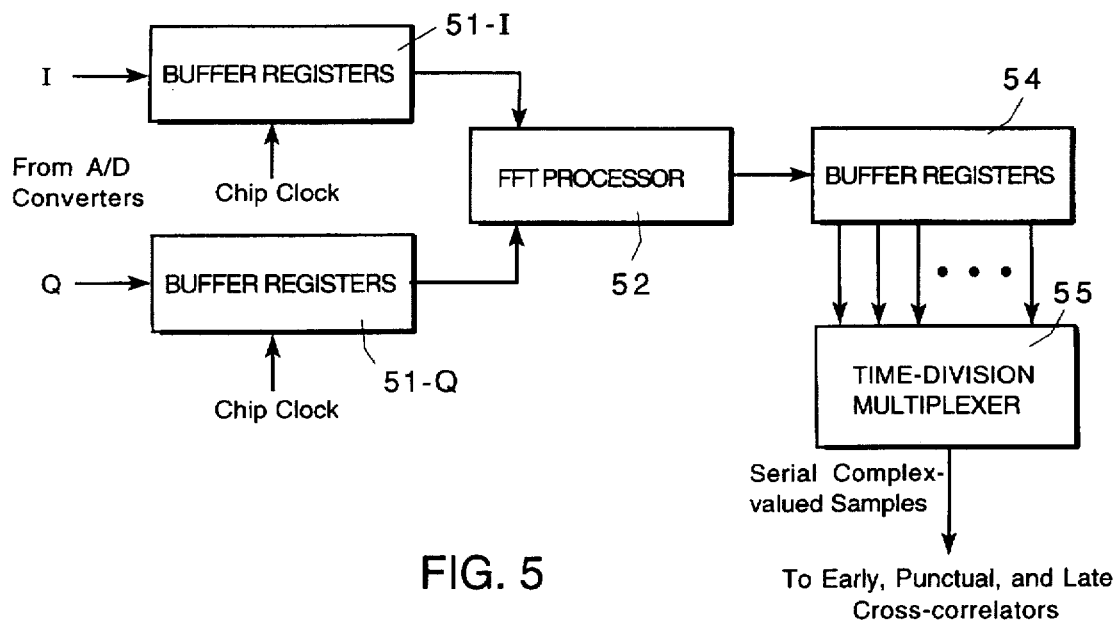
FIG. 5 is a block diagram of fast Fourier transform (FFT) subsystem.

The FFT subsystem 50 (shown in FIG. 5) of the digital demodulator 36 accepts the I and Q sample streams from the two A/D converters 35I, 35Q. The digital outputs are then stored in a buffer 51I, 51Q until a block of data is acquired that is equal to the size of the fast Fourier transform (FFT) block. Typically this might be 32 or 64 samples In size. The A/D sample timing is controlled by the delay lock loop synchronization circuit in the digital demodulator 36 such that chip synchronous sampling results. The FFT block size is made equal to the length of a PN/RW chip and a chip synchronization signal (the chip clock) is sent to the buffer preceding the FFT to align the FFT block with the chip. That is, each PN/RW chip on each of the M MCM carriers is constant over the FFT block. The output to the FFT (computed at the end of each block) is a set of L complex values where L is the size of the FFT block and L>M where M is the number of MCM carriers. By careful selection of the sampling rate, it is possible to make the MCM carrier frequencies lie on the components of the FFT. Since L>M, only those M components corresponding to the MCM carriers are selected for processing. Thus, the complex-valued outputs of the FFT 52, which are temporarily stored in the illustrated buffer registers 54, correspond to the PN/RW modulated, phase rotated, and noise corrupted MCM data symbols. These M signals are sampled by multiplexer 55 and sent in serial sequence to the digital demodulator 36 (FIG. 4). In other words, the complex-valued parallel outputs are time-division multiplexed into a single serial stream of complex valued samples.

The digital demodulator 36 strips off the PN/RW chip modulation, differentially coherently (DPSK) 62 demodulates the QPSK data, generates the AFC voltage 64D, and performs the delay-lock loop function, providing a delay control voltage from filter 64F to the voltage controlled clock 37 (FIG. 3). The latter function is required for several reasons. First, by locking to the received PN/RW code one is capable of doing chip synchronous sampling. Typically, one would have 32 or 64 samples per chip. The exact number, which may be greater than 64, will depend on the occupied bandwidth and the number of MCM carriers M. Second, the delay-look loop operation keeps the FFT blocks aligned with the PN chips. Third, code synchronization is required in order to strip off the PN/RW modulation.

Differentially-coherent detection of the QPSK signals is used in the preferred embodiment for three reasons. First, although it is about 2.2 dB less power efficient than coherent detection it is simpler to implement. Second, it works better in the presence of multipath fading since it recovers more quickly from a fade than a phase-lock loop(PLL). Third, due to channel filtering and multipath effects the absolute phase of each MCM carrier will be different and potentially time variant. It is much simpler to build a time-shared DPSK detector which automatically compensates for these phase shifts rather than to build M separate PLLS.

The form of the digital demodulator 36 is particularly advantageous in that through the use of time-division multiplexing it is possible to time-share the various subsystems rather than building separate subsystems for each of the M carriers.

Thus, the despreading cross-correlator and associated integrate-and-dump (I&D), the DPSK detector 62, the AFC discriminator, and the delay-lock loop are all operated on a time-shared basis. For the case of the latter two a common control voltage is obtained by averaging over all M of the MCM carriers. Thus, the AFC and delay-lock loop subsystems are particularly robust. If frequency-selective fading were to greatly attenuate a few of the MCM carriers, it would have negligible impact on the performance of these loops.

Figure 6:
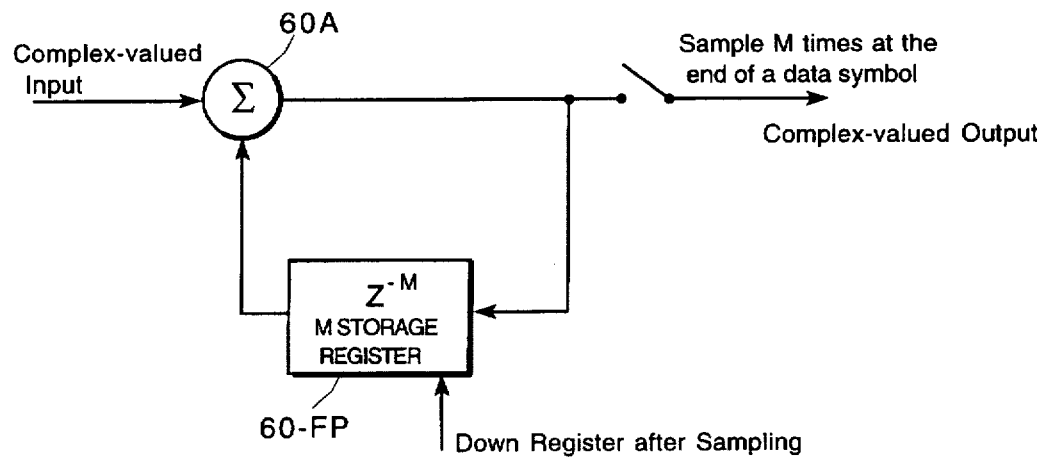
FIG. 6 is a block diagram of a time-shared integrate-and-dump (I&D) circuit.
Figure 7:
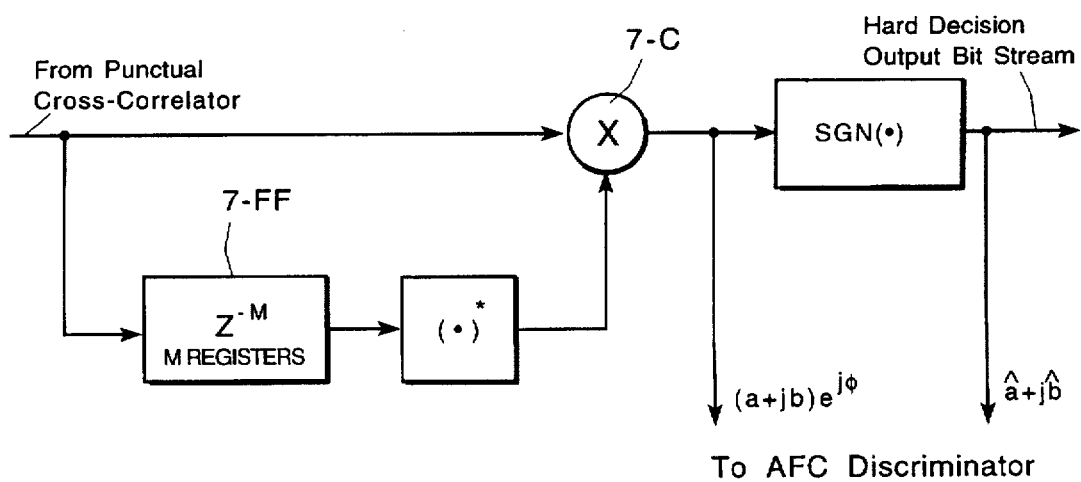
FIG. 7 is a block diagram of time-shared DPSK detector.

Note that the time-shared subsystems are slightly more complex than the conventional non-time-shared versions. For example, in the time-shared I&D circuit (shown In FIG. 6) the feedback path 60FP of the accumulator includes M registers rather than the one register in the conventional circuit. The same thing is true for the I&D circuits 61 that are part of the early and late cross-correlators 60E, 60L in the DLL. For the DPSK detector (shown in FIG. 7), analogously, the feed forward delayed path 7-FF has M registers rather than simply one. Soft-decision outputs are obtained by appropriately delaying the received samples, forming their complex conjugate, and multiplying with the present received sample as shown. Hard-decision outputs are obtained by taking the sign bit of the soft-decision bits. The hard decision bits are the data traffic output from the receiver. Both the soft and hard decision outputs are sent to the division-directed AFC discriminator 64D.

Figure 9:
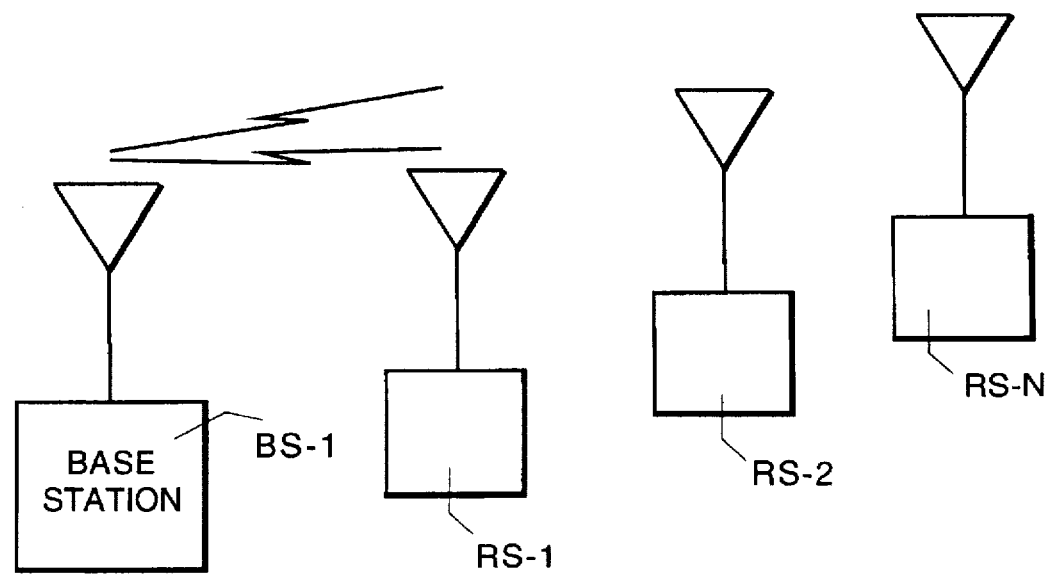
FIG. 9 is a schematic block diagram of an orthogonal code division multiple access communication system having at least one base station and a plurality of remote subscriber stations.

An orthogonal code division multiple access communications system having at least one base station BS-1 and a plurality of remote subscriber terminals RS-1, is RS-2 . . . RS-N, and incorporating the invention is illustrated in FIG. 9.

Figure 8:
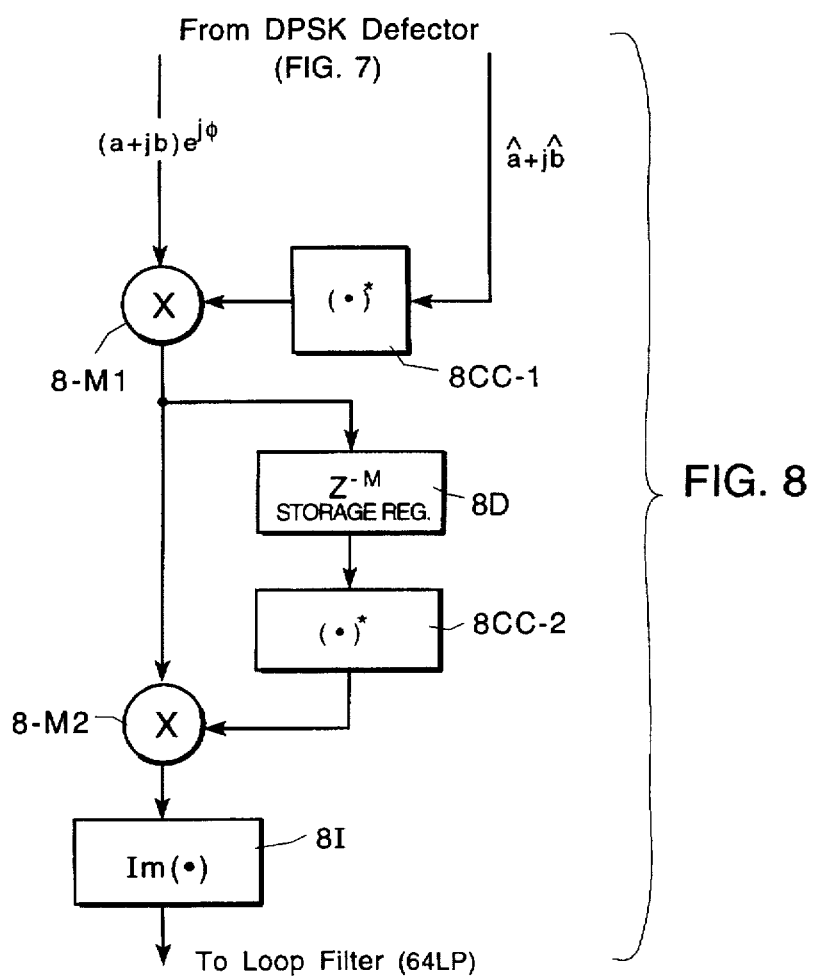
FIG. 8 is a block diagram of time-shared decision-directed AFC discriminator.

As shown in the block diagram of the AFC discriminator 64D (see FIG. 8) the data modulation is removed by taking the complex conjugate 8CC=2 of the hard decisions and multiplying 8-M1 this signal with the soft-decision output. Once the data modulation is removed a frequency error estimate is formed by comparing the phases between samples that are spaced by M rather than one as would be the case for a conventional non-time-shared AFC discriminator. Phase comparison is performed by taking the complex conjugate 8-CC-2 of the delayed sampled from 8D an multiplying 8-M2 it with the present sample. The imaginary part (obtained by the IM(*) 8-I function) is proportional to the sine of the phase difference between the two samples. In other words, since the phase difference is proportional to the frequency error the output is proportional to the sine of the frequency error. This output is sent to a low-pass loop filter 64LP (FIG. 4) whose output drives the VCO 39 shown in FIG. 3.

The invention encompasses the following features:

1) a system and technique means based on multicarrier modulation (MCM) to greatly reduce the sensitivity of OCDMA to access noise created by time base error and delay spread.

2) a system and technique means based on the FFT and time division multiplexing to computationally efficiently (i.e., minimal hardware) implement the receiver for an MCM OODMA signal.

3) a system and technique to obtain particularly robust delay-lock loop code tracking in the presence of frequency-selective fading.

4) a system and technique to obtain particularly robust automatic frequency control in the presence of frequency-selective fading.

While the invention has been shown and described in an illustrative embodiment, it will be appreciated that various other embodiments, adaptations and modifications, may be made by those skilled in the art without departing from the spirit and scope of the invention.

What is claimed is:

1. In an orthogonal code division multiple access (OCDMA) communication system having at least one base station and a plurality of remote subscriber terminals, a modulation system for reducing sensitivity of OCDMA to access noise created by time base error and delay spread, comprising: means to divide an incoming data stream into multiple parallel data streams, means providing a corresponding plurality of frequency division multiplexed carriers, means providing a corresponding plurality of carrier channels connected to receive respective ones of said multiple parallel data stream, modulator means in each of said channels, each carrier channel having an output, means to sum the outputs of each modulator of the modulator means to produce a composite multicarrier waveform signal, means spreading said composite multicarrier waveform signals with a selected PN/RW code, and means to convert the spread composite multicarrier waveform signal to a desired broadcast frequency, amplify and transmit to remote subscriber terminals.

2. The OCDMA communication system defined in claim 1, each subscriber terminal including a receiver having a digital demodulator having early, late, and punctual correlators and a fast Fourier transform (FFT) processor means and a time-division multiplexer connected to said FFT processor means for providing serial signal samples to said early, late and punctual correlators.

3. The OCDMA communication system defined in claim 1 wherein each modulator of said modulator means is a QPSK modulator.

4. The OCDMA communication system defined in claim 1 wherein each subscriber terminal includes a receiver having a digital demodulator, said digital demodulator including means to differentially-coherently detect QPSK signals.

5. In an orthogonal code division multiple access (OCDMA) communication system having at least one base station and a plurality of remote subscriber terminals, characterized by a modulation system for reducing sensitivity of OCDMA to access noise created by time base error and delay spread, comprising: means to divide an incoming data stream into multiple parallel data streams, means providing a corresponding plurality of frequency division multiplexed carriers, means forming a corresponding plurality of carrier channels, QPSK modulator means in each of said carrier channels, each carrier channel being connected to receive respective ones of said multiple parallel data streams and having an output, means to sum the outputs of each QPSK modulator of the QPSK modulator means to produce a composite multicarrier waveform, a source of a selected PN/RW code, means spreading said composite multicarrier waveform with a selected one of said PN/RW code to produce a spread spectrum multicarrier waveform signal, and means to convert the spread spectrum multicarrier waveform signal to a desired broadcast frequency, amplify and transmit to remote subscriber terminals.

6. The OCDMA communication system defined in claim 5 wherein each subscriber terminal includes a receiver having a digital demodulator, said digital demodulator having early, late, and punctual correlators and a fast Fourier transform (FFT) processor means and a time-division multiplexer connected to said FFT processor means for providing serial signal samples to said early, late and punctual correlators.

7. In an orthagonal code division multiple access (OCDMA) communication system having at least one base station and a plurality of remote subscriber terminals, characterized by a modulation system for reducing sensitivity of OCDMA to access noise created by time base error and delay spread, comprising: means to divide an incoming data stream into multiple parallel data streams, means providing a corresponding plurality of frequency division multiplexed carriers, means forming a corresponding plurality of carrier channels, QPSK modulator means in each of said carrier channels, each carrier channel being connected to receive respective ones of said multiple parallel data streams and having an output, means to sum the outputs of each QPSK modulator of the QPSK modulator means to produce a composite multicarrier waveform signal, a source of a selected PN/RW code, BPSK modulator means for spreading said composite multicarrier waveform signal with a selected one of said PN/RW code to produce a spread spectrum multicarrier waveform signal, and means to convert the spread spectrum multicarrier waveform signal to a desired broadcast frequency, amplify and transmit to remote subscriber terminals.

* * * * *